US007486696B2

(12) United States Patent
Garg et al.

(10) Patent No.: US 7,486,696 B2
(45) Date of Patent: Feb. 3, 2009

(54) SYSTEM AND METHOD FOR PROVIDING BANDWIDTH MANAGEMENT FOR VPNS

(75) Inventors: Sachin Garg, Green Brook, NJ (US); Martin Kappes, Bridgewater, NJ (US); Mahalingam Mani, Sunnyvale, CA (US)

(73) Assignee: Avaya, Inc., Lincroft, NJ (US)

( * ) Notice: Subject to any disclaimer, the term of this patent is extended or adjusted under 35 U.S.C. 154(b) by 1094 days.

(21) Appl. No.: 10/178,762

(22) Filed: Jun. 25, 2002

(65) Prior Publication Data
US 2003/0235209 A1    Dec. 25, 2003

(51) Int. Cl.
   *H04J 3/16* (2006.01)
(52) U.S. Cl. ....................................... 370/468
(58) Field of Classification Search ................. 370/468, 370/229, 469, 392, 232, 253, 235, 252, 230.1, 370/230; 711/104; 709/238
   See application file for complete search history.

(56) References Cited

U.S. PATENT DOCUMENTS

| 5,995,488 | A  | * | 11/1999 | Kalkunte et al. | ............ | 370/232 |
| 6,092,113 | A  | * | 7/2000  | Maeshima et al. | .......... | 709/230 |
| 6,222,856 | B1 | * | 4/2001  | Krishnan et al. | ............ | 370/468 |
| 6,331,986 | B1 |   | 12/2001 | Mitra et al. | | |
| 6,680,933 | B1 | * | 1/2004  | Cheesman et al. | .......... | 370/352 |
| 6,901,052 | B2 | * | 5/2005  | Buskirk et al. | .............. | 370/235 |
| 6,904,057 | B2 | * | 6/2005  | Sarkinen et al. | ............. | 370/469 |
| 6,912,232 | B1 | * | 6/2005  | Duffield et al. | ............. | 370/468 |
| 6,944,168 | B2 | * | 9/2005  | Paatela et al. | ............... | 370/401 |
| 7,042,848 | B2 | * | 5/2006  | Santiago et al. | ............. | 370/253 |

OTHER PUBLICATIONS

Allot Communications, "Radguard and Allot Communications Join Forces to Deliver IPSec Secure Guaranteed Bandwidth," found at http://www.allot.com/html/jan_18_2000.shtm, P1~2.
Fan et al., "Integrating QoS and security functions in an IP-VPN gateway" APOC 2001: Asia-Pacific Optical and Wireless Comunications. Metro and Access Networks, Beijing, China 12-15, vol. 4583, pp. 116-122, XP009016911 (Nov. 2001).
Floyd et al., "Link-Sharing and Resource Management Models for Packet Networks", IEEE/ACM Transactions on Networking, IEEE Inc. New York, US, vol. 3, No. 4, pp. 365-386, XP000520857, (Aug. 1, 1995).
Lee et al., "Avoiding Congestion Collapse on the Internet Using TCP Tunnels", Computer Networks, vol. 39, pp. 207-219 (2002).

* cited by examiner

*Primary Examiner*—Chi H Pham
*Assistant Examiner*—Alexander Boakye
(74) *Attorney, Agent, or Firm*—Muncy, Geissler, Olds & Lowe, PLLC

(57) ABSTRACT

A method and system for controlling the bandwidths of data traffic over virtual private networks are provided. The method includes classifying the data traffic for the virtual private network into different flows, monitoring a current bandwidth usage by at least one of the flows, comparing the current bandwidth usage with a predetermined threshold for the flow, and performing a bandwidth control operation for the flow if the current bandwidth usage exceeds the predetermined threshold for that flow.

37 Claims, 3 Drawing Sheets

SYSTEM AND METHOD FOR PROVIDING BANDWIDTH MANAGEMENT FOR VPNS

BACKGROUND OF THE INVENTION

1. Field of the Invention

The invention relates to a technique of managing the bandwidth of data traffic in an Internet Protocol (IP) Virtual Private Network (VPN) so as to provide Quality of Service (QoS) for the VPN, where VPN traffic is communicated preferably over the VPN.

2. Discussion of the Related Art

IP VPNs (hereinafter "VPNs") are specially configured networks that allow a group of users to communicate only with each other in a secured manner. Generally, VPNs are implemented over unsecured public networks of the wired nature (e.g., cable, DSL, dial-up, etc.) and/or of the wireless nature (e.g., IEEE 802.11 wireless local area networks (LANs), cellular digital packet data (CDPD) networks, etc.). In a VPN, data packets are encrypted and encapsulated in some other packets to provide a more secured data communication. The packet that encapsulates the original packet is referred to herein as the "encapsulating packet," whereas the original packet is referred to herein as the "encapsulated packet."

QoS refers to a technique and ability to control certain network requirements such as bandwidth requirements for packet transmission, latency requirements, maximum packet loss, etc. There are a number of different ways to provide QoS to existing TCP/IP-based networks that do not employ VPNs. For instance, Internet Engineering Task Force (IETF), which is a group of individuals who determine new protocols and application requirements, has proposed a differentiated services (DiffServ) framework or an integrated services framework for providing QoS to non-VPNs. Also, the use of an existing TCP rate control mechanism to provide QoS in a non-VPN has been proposed by Packeteer, Inc., Allot Communications, Ltd., or Sitara Networks, Inc.

Among the known QoS methods, one way of providing QoS in a non-VPN is to provide a special field called the Type of Service (ToS) in the header of an IP packet. Generally, an IP packet consists of a header and a body. The body contains data, whereas the header contains information such as source and destination IP addresses, protocol type used in the data, etc. The ToS field in the header of the packet is 3 bits in length. The value of these 3 bits in an IP packet specifies the level of priority this packet should receive in the network. With the use of 3 bit ToS, a total of 8 priority levels can be specified. Once the priority levels are set in the packet (either by the application or by a router/switch/gateway along the path of this packet), all subsequent devices which this packet traverses treat this packet according to the specified priority. For instance, a router which receives two packets, one with priority 1 and the other with priority 6, will forward the higher priority packet before forwarding the lower priority packet. Ultimately, this results in higher bandwidth, and lower delay, loss and jitter characteristics for the packets with higher priorities, thereby ensuring QoS. The IETF DiffServ proposal specifies the use of 6 bits (called DiffServ bits) in the header of an IP packet for the same purpose.

However, such existing QoS methods for non-VPNs simply do not work for VPNs because the header information of encapsulated packets communicated in VPNs is encrypted and the existing QoS methods for non-VPNs require such header information to be in a non-encrypted form (in clear text).

Recently, a proposal has been made by Radguard, Inc. and Allot Communications, Ltd. to provide QoS for VPNs using ToS or DiffServ bits. With VPNS, it is known that the original IP packet is encrypted and encapsulated in another IP packet. This means that the ToS or DiffServ bits in the original IP header are now hidden from any router/switch which is supposed to treat incoming packets based on priority. The Radguard and Allot proposal deals with IP packets constituting an IP layer (Layer 3), and simply removes this short-coming by exposing the ToS/DiffServ bits in the original IP header to the header of the encapsulating IP packet. This way the priority information is available to all devices that receive the packet.

Another proposal for a QoS method applicable to a VPN has been made by an IEEE 802.11e working group. However, the IEEE proposal addresses the QoS for only the wireless link and is concerned with enhancing QoS for media access control (MAC) protocol. Thus, for a packet traversing multiple devices, the IEEE proposal would only work for the wireless side (i.e., the link between the client and the Access Point (AP) and not for the wired side (e.g., the link between the server and the AP). The IEEE proposal is still in the draft stage and at this time consists of two ways to satisfy the different QoS needs of different frames which constitute a MAC layer (Layer 2).

The first way to provide QoS according to the IEEE proposal is using different priority levels of frames. Similar to IP packets, this allows the use of a priority field in the frame header and based on the value in this field, only the Access Point determines which frames receive preferential treatment. The second way to provide QoS according to the IEEE proposal is using a modification to the current channel access mechanism. This modification essentially allows the Access Point to schedule packet transmissions from each client at pre-specified times based on the QoS requirements of each client.

However, there are problems associated with the existing QoS techniques. First, none of the QoS techniques for VPNs above address effectively the bandwidth gap problem between wired and wireless sides. Generally, the maximum bandwidth for switched Ethernet wired networks is typically 100 Mbps, whereas the effective bandwidth for wireless 802.11b networks is only approximately 7 Mbps. But, the existing QoS techniques do not provide effective bandwidth management needed to conduct data transmission over such a tight bandwidth allotment for the wireless side. Secondly, the QoS techniques for the wired side cannot be combined with the QoS techniques for the wireless side to provide an end-to-end solution, because they operate on different layers. For instance, the IEEE proposal operates on the frames which constitute the MAC layer (Layer 2), whereas the Radguard proposal operates on IP packets constituting the IP layer (Layers 3 and 4).

Therefore, there is a need for an improved technique of managing the bandwidth of data traffic for VPNs to provide QoS, which overcomes the above-described problems and limitations of the related art.

SUMMARY OF THE INVENTION

The present invention provides a method and system for providing bandwidth management for packet-based VPNs, which overcome problems and disadvantages of the related art. Particularly, in the present invention, a method for controlling the bandwidth of data traffic for a virtual private network, includes classifying the data traffic for the virtual private network into different flows, monitoring a current bandwidth usage by at least one of the flows, comparing the current bandwidth usage with a predetermined threshold for the flow, and performing a bandwidth control operation for the flow if the current bandwidth usage exceeds the predetermined threshold for that flow.

Advantages of the present invention will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus do not limit the present invention.

DETAILED DESCRIPTION OF THE PREFERRED EMBODIMENTS

Figure 1:
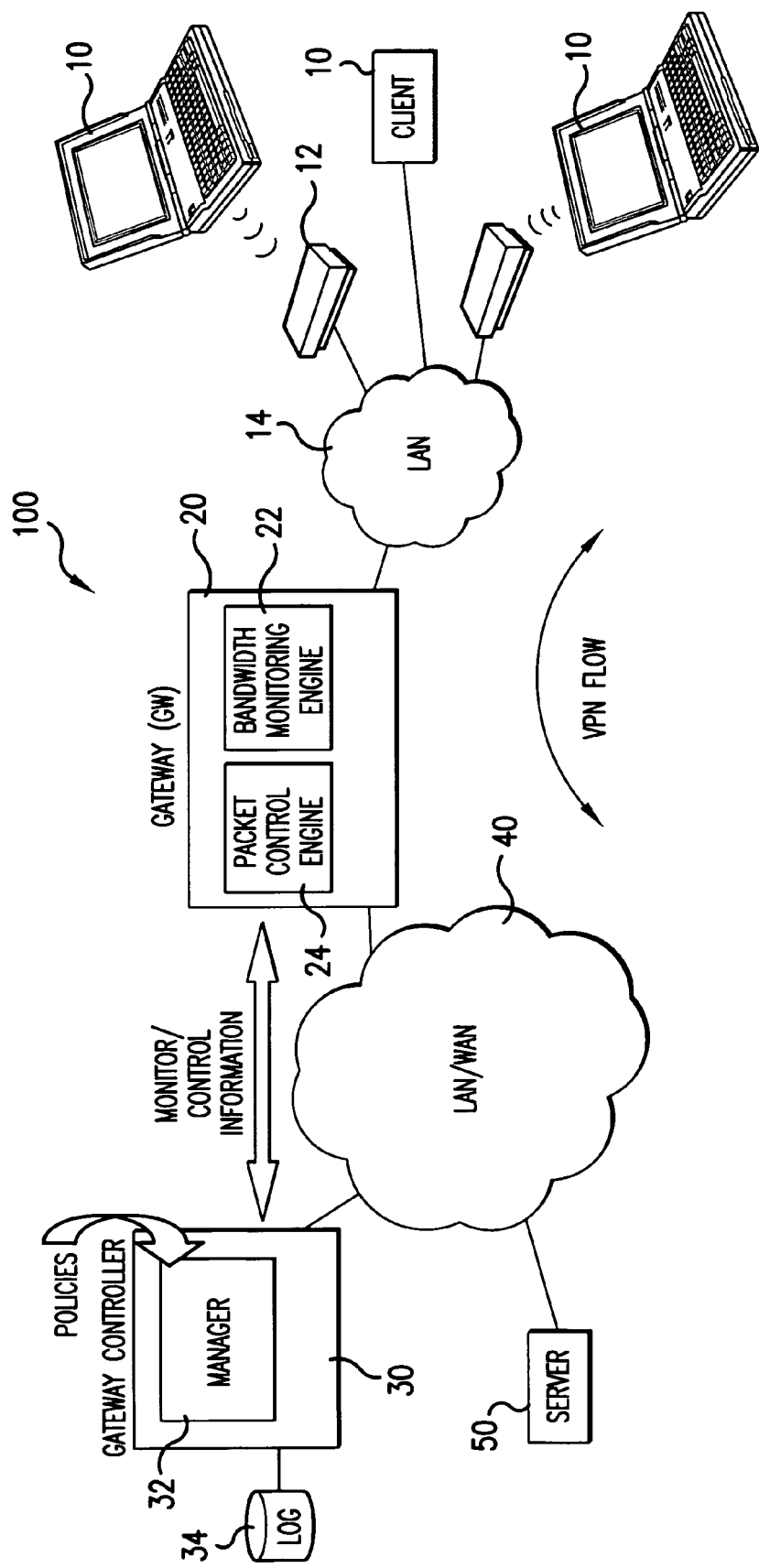
FIG. 1 is a diagram of a system for monitoring and controlling the bandwidth of data traffic for a VPN according to an embodiment of the present invention.

FIG. 1 is a diagram of a system 100 for managing the bandwidth of data traffic in a VPN according to an embodiment of the present invention. As shown in FIG. 1, the system 100 includes one or more client devices 10 communicating with a server 50 over one or more communication networks 14, 40 through a gateway (GW) 20. Each of the communications networks 14, 40 may be a local area network (LAN), a wide area network (WAN), other network type known in the art, or a combination thereof, and can be of wireless or wired type. Each client device 10 may be a computer with a known wireless connectivity through a base station 12, or may be a computer with a known wired connectivity. The networks 14, 40, client devices 10 and the server 50 are all known in the art. All the components in the system 100 are operatively coupled.

The gateway (GW) 20, which may be a wireless GW or wired GW depending on the network type, intercepts all traffic from the client device 10 to the server 50 and from the server 50 to the client device 10. The GW 20 controls the bandwidth of the traffic per connection or per flow under control of a gateway controller 30. In one embodiment, the gateway controller 30 may reside on the GW 20 itself.

The GW 20 includes a bandwidth monitoring engine 22 and a packet or bandwidth control engine 24, all operatively coupled. The bandwidth monitoring engine 22 monitors flows of network traffic between the client devices 10 and the server 50, and provides information on the bandwidth utilized by each client on a per flow basis to the gateway controller 30 via a permanent TCP connection or other known connection. In one example, a window of 2 seconds is used to compute this bandwidth information, but other criteria may be used. The packet control engine 24 receives bandwidth control commands or instructions from the gateway controller 30 on when and how to selectively drop or deny packets to be transmitted to the client device 10 or the server 50, and executes these bandwidth control commands appropriately.

In addition, various known software modules are generally present in the GW 20, some may be built-in in the kernels therein, others may be implemented in the user-space as known. In this embodiment, the GW 20 is implemented in JAVA computer programming language since it is platform-independent; however, it can be implemented using any other existing computer programming language.

The gateway controller 30 includes a manager 32 and a storage unit 34, all operatively coupled. The storage unit 34 may reside as part of the gateway controller 30 or may be a separate storage device such as a disc, DVD, CD, etc. The manager 32 receives the bandwidth information and any other information from the bandwidth monitoring engine 22, and generates and sends appropriate bandwidth control commands on when and how to drop or deny packets in each of flows for each of the client devices 10 and/or server 50. The manager 32 generates the bandwidth control commands based on certain control criteria. Such control criteria may include, but are not limited to, predetermined policies on managing bandwidth of various traffic flows such as policies on enforcing predefined bandwidth utilization thresholds for specific users, applications or per-flow; admission control policies on when to deny certain traffic (e.g., "deny any HTTP traffic if there is an ongoing VoIP session and the wireless link is more than 70% utilized); policies on for how long to delay certain packets; etc.

The control criteria may be also based on the type of connection used, and/or the direction of the traffic. Regarding the type of connection used, for instance, for a User Datagram Protocol (UDP) connection, when to accept and deny packets is computed by the gateway controller 30 based on the specific desired bandwidth. For a Transport Control Protocol (TCP) connection, instead of specifying a desired bandwidth, an administrator or the like may input a desired bandwidth manually. Regarding the direction of the traffic, for instance, for a UDP connection, such bandwidth control commands may be sent from a wired device to a wireless device, and not necessarily from a wireless device to a wired device. For a TCP connection, however, the direction of the traffic does not matter. For UDP, bandwidth control is enforced from the gateway to the destination of the traffic whereas for TCP, bandwidth management is performed in both directions at the same time.

Any data such as the bandwidth information from the GW 20 can be stored in the storage unit 34 for record keeping purposes and/or displaying to end-users or administrators if needed. Further, any other information and data being processed in the system 100 can be stored in the storage unit 34. For instance, any packet control activity performed by the packet control engine 24 of the GW 20 can be logged into the storage unit 34.

Figure 2:
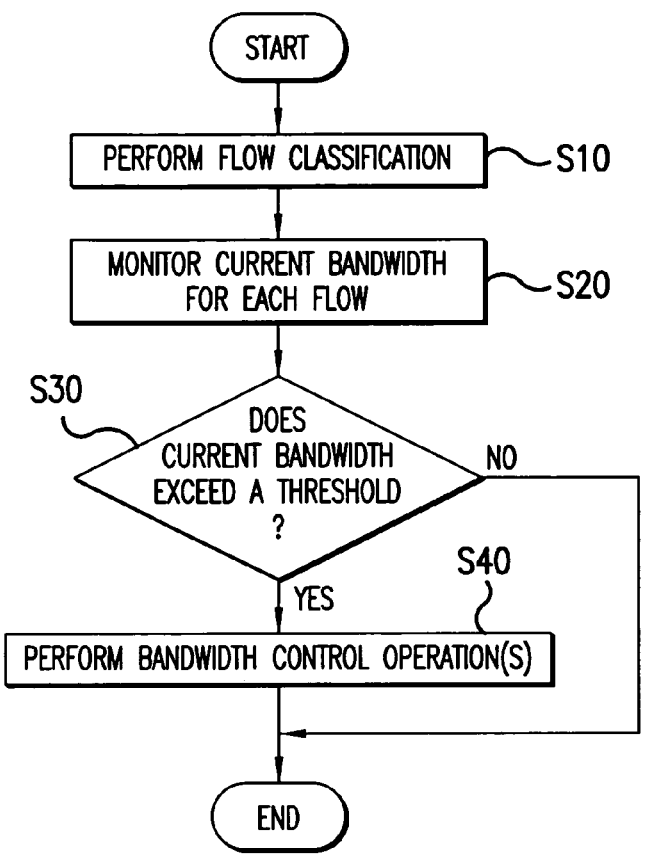
FIG. 2 is a flowchart illustrating processing steps of a method of monitoring and controlling the bandwidth of data traffic in a VPN according to an embodiment of the present invention.

FIG. 2 is a flowchart illustrating processing steps of a method of controlling the bandwidth of data traffic in a VPN according to an embodiment of the present invention. These processing steps can be implemented in the system 100 of FIG. 1 or other similar system.

As shown in FIG. 2, in Step S10, the VPN data traffic between the client 10 and the server 50 is classified into different flows. This flow classification can be implemented as follows by the bandwidth monitoring engine 22 or any other suitable component of the system 100. In a non-VPN flow classification technique, the IP header or the MAC address of the original IP packet is examined to separate data traffic into flows for some purpose, e.g., for routers and switches. This is possible in the non-VPN since the IP packets are neither encrypted nor encapsulated. However, in VPNs, an original packet is encrypted and encapsulated in another IP packet and the existing non-VPN flow classification technique cannot be applied. Instead, according to one embodiment of the present invention, IP header information of encapsulating IP packets (and not the original encapsulated packets) is examined, and all traffic belonging to the same IP address is classified as a single flow. In accordance with another embodiment of the present invention, the source and destination MAC addresses provided at Layer 2 are examined. All traffic belonging to the same source or destination MAC address is then classified as a single flow. In accordance with still another embodiment of the present invention, ToS or DiffServ bits are provided in the IP header of the encapsulating IP packet and are examined. Typically, these bits are set in the IP header of an original (encapsulated) packet so that routers or switches in the flow path can allocate necessary resources to handle these packets, which would include appropriate priority queuing and priority scheduling. In a related art as discussed above, the ToS/DiffServ bits in the encapsulated packet are exported and placed in the IP header of the encapsulating packet, such that the appropriate priorities can be assigned by network elements on the flow path. Then, since the ToS/DiffServ bits are visible in the encapsulating IP header, the GW 20 in the present invention examines the ToS/DiffServ fields of the incoming encapsulated packets, and classifies all packets with the same ToS/DiffServ bits as a single flow. Generally, 3 ToS bits or 6 DiffServ bits are used. If 3 ToS bits are used, then 8 different flows can be classified, whereas if 6 DiffServ bits are used, then 64 different flows can be classified.

In accordance with one embodiment of the present invention, any combination of the above flow classification processes for the VPNs may be used to provide a more granulated flow classification. For instance, all frames having the same source and destination MAC address and the same ToS or DiffServ bits in the encapsulating IP headers, can be classified into a single flow. In this process, while using the source and destination MAC addresses of Layer 2 frames allows the flow to be classified on a per-station (machine) basis, it may not necessarily distinguish between various application traffics originating from or destined for the same station. On the other hand, the use of ToS/DiffServ bits in the encapsulating IP header may not necessarily distinguish between traffics from different end-stations as long as their ToS/DiffServ bits are the same. Thus, the use of a combination of the MAC address and ToS/DiffServ bits provides a finer-grained flow classification process for the VPN. Furthermore, by using this type of flow classification, for example, a VoIP connection from client A can be distinguished from Web traffic from the same client as well as ERP traffic from client B.

Once the traffic has been classified into different flows, in Step S20 the current bandwidth of each of the defined flows is monitored by the bandwidth monitoring engine 22 of the GW 20. This can be accomplished in many different ways. As one implementation, the bandwidth monitoring engine 22 is configured to take a fixed time window and then to count the number of packets belonging to a particular flow that arrive in that time window. The size of each packet, flow type, number of packets, time window, and any other information can be used to compute the bandwidth usage for each flow, as known in the art. The GW 20 transmits the bandwidth information obtained from the monitoring process to the gateway controller 30 periodically or as needed.

In Step S30, the gateway controller 30 determines whether the current bandwidth of each flow exceeds a desired bandwidth threshold. The desired bandwidth threshold, i.e., the desired bandwidth that should be used by each flow is determined based on the QoS requirements. The QoS requirements would set the desired bandwidth for different types of flows. For instance, a VoIP flow may be permitted to utilize 64 Kbps with acceptable delay, loss and jitter characteristics, whereas a flow with less priority or importance may be permitted to use a less bandwidth. The QoS requirements for each flow are predetermined by an administrator or some other means, and are input as control policies into the gateway controller 30 as discussed above. The gateway controller 30 then computes what the desired bandwidth threshold should be for each flow, and compares the current bandwidth of each flow with the desired bandwidth threshold. If the current bandwidth usage does not exceed the desired bandwidth threshold, then no separate bandwidth control operation is performed and the process ends.

However, at Step S30 if it is determined that the current bandwidth of each flow exceeds the corresponding desired bandwidth threshold, then in Step S40 a bandwidth control operation is performed for the appropriate flows according to the present invention. The bandwidth control operation is triggered by the gateway controller 30 which generates bandwidth control commands on when and how to drop or deny packets (encapsulating packets) and transmits the commands to the packet control engine 24 of the GW 20. The packet control engine 24 then executes these bandwidth control commands by dropping or denying encapsulating (VPN) packets according to the criteria set in the control commands.

Generally, because of the packet encryption and encapsulation, the system may not know what type of data (e.g., TCP or UDP) is contained in the encapsulating packets. Thus, in a preferred embodiment, the system drops any packets which may be data packets or acknowledgement (ACK) packets assuming first that the TCP traffic is involved. In this case, it does not matter whether the dropped packet is a data packet or ACK packet since the same effect of triggering the TCP's congestion control is obtained. If the data contained in the VPN packet is indeed TCP traffic, at the packet source or destination side, the packet-dropping or packet-denying operation is interpreted as a traffic congestion, which triggers TCP's built-in congestion control algorithm. That is, if the server does not receive an acknowledgement/data packet at certain times, then TCP's built-in congestion control algorithm causes the server to interpret this as a presence of a traffic congestion and slows down the rate at which data packets are transmitted to the client, whereby the bandwidth of the packet flow is controlled. This has the same effect of reducing the bandwidth of the flow and would free the medium to allow higher bandwidth usage by other higher-priority flows.

If the data contained in the VPN packet is UDP traffic, then the packet dropping operation would not trigger the TCP's built-in congestion control algorithm, and a bandwidth control operation for UDP traffic is performed which is discussed later in detail. Generally, one skilled in the art would readily understand that the system 100 performs simultaneously multiple bandwidth control operations for multiple flows at a given time. Once the bandwidth control has been accomplished for each flow, the process ends.

Figure 3:
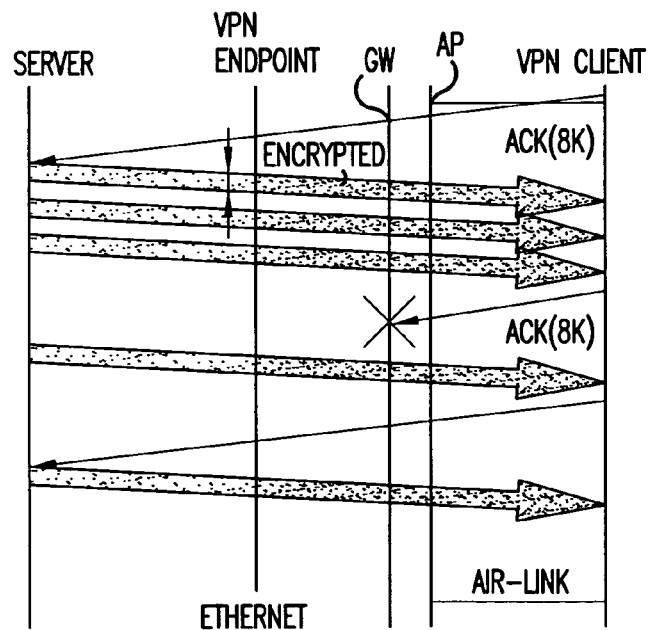
FIG. 3 is a diagram depicting one example of a bandwidth control operation in a VPN, which is usable in the method of FIG. 2 according to one embodiment of the present invention.

FIG. 3 shows a diagram depicting one example of a bandwidth control operation according to one embodiment of the present, which can be performed in Step S40 of FIG. 2. A VPN traffic generally constitutes TCP or UDP segments in encapsulated IP packets. Typically, more than 90% of the total traffic in VPNs is TCP traffic. VoIP, however, is generally over UDP traffic. FIG. 3 applies to the transmission of TCP traffic in a VPN according to the present invention. In this example, the GW 20 is a wireless GW.

As shown in FIG. 3, the TCP data packets are transmitted from a server (such as the server 50) to a VPN client (such as the client 10) over communications network(s)14, 40. The gateway controller 30 classifies the traffic into different flows as discussed above, and then generates and transmits bandwidth control commands to drop certain packets which may be acknowledgement (ACK) packets transmitted from the VPN client to the server in acknowledging receipt of the incoming packets from the server. The GW 20 then executes these bandwidth control commands and thereby drops certain ACK packets, which in turn triggers the build-in TCP congestion control mechanism to slow down the packet transmission rate and thus control the bandwidth usage by each flow according to the present invention.

Regarding FIG. 3, although dropping of ACK packets has been discussed to provide the bandwidth control, as discussed in connection with FIG. 2, the packet(s) that the GW 20 drops may not be ACK packet(s), but instead may be data packet(s). The behavior of the flow in terms of bandwidth consumption in these two cases is more or less identical (especially if the data flow occurs in both directions) since the ACK packets are often "piggybacked" on a data packet.

Now, having described the bandwidth control for a TCP traffic for a VPN, a bandwidth control for a UDP traffic over a VPN is described according to an embodiment of the present invention. As known, UDP is a connectionless packet transmission protocol and thus, no ACK packet is involved in UDP transmissions. Thus, if it is known that an incoming traffic mainly consists of UDP traffic, the present invention drops incoming data packets (encapsulating packets) in the GW 20 that exceed a predetermined bandwidth threshold. These packets are not ACK packets. A predetermined bandwidth threshold can be input by an administrator or can be determined automatically by the system. In one embodiment, instead of dropping the incoming packets to satisfy the desired bandwidth, a pulse function of alternating 'accept' and 'deny' times for packets can be used to drop packets on and off, more periodically throughout the flow. This would disperse the impact of dropping packets throughout the flow.

For UDP traffic from the wired to wireless side, the accept and deny times according to one embodiment are computed by taking into account the currently used bandwidth $b_{curr}$, the desired bandwidth $b_{desd}$, and the average interpacket arrival time $t_{avg}$ for that connection. This can be accomplished by choosing the deny time $t_{deny}$ and the accept time $t_{accept}$ such that the following relationship is established:

$$(t_{accept})/(t_{accept}+t_{deny})=b_{desd}/b_{curr}.$$

Furthermore, the average interpacket arrival time $t_{avg}$ can be set as follows:

$$\min\{t_{accept}, t_{deny}\}=t_{avg}.$$

That is, the lesser of $t_{accept}$ and $t_{deny}$ is selected as $t_{avg}$. This ensures that only the minimal number of consecutive packets are dropped in the process of obtaining the desired bandwidth. For feasibility purposes, in one example, the interpacket arrival time may not be below 50 ms. Experiments indicate that the bandwidth observed for such connections can be controlled accurately by this approach.

Figure 4:
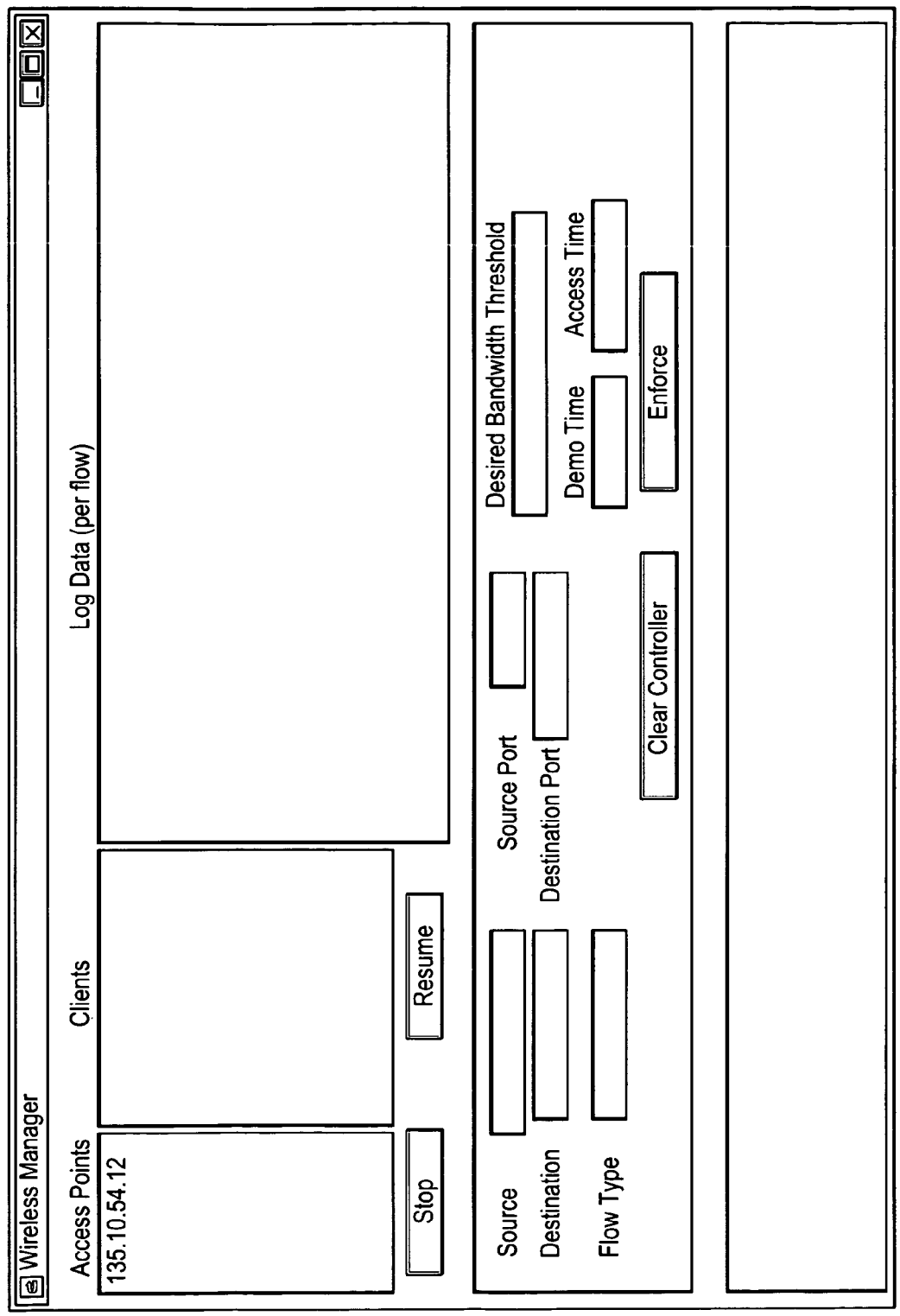
FIG. 4 is an example of a graphical user interface (GUI) usable in the system and method of FIGS. 1 and 2 according to one embodiment of the present invention.

FIG. 4 is one example of a graphical user interface (GUI) usable in the system of FIG. 1 according to one embodiment of the present invention. As shown, the GW 20 and/or the gateway controller 30 can be configured to provide a GUI so that a user or administrator can view and/or enter inputs as needed by the system. Obviously, screen displays with different formats, configurations, shapes, etc. can be used in the present invention.

In one embodiment, the system can be configured such that the flow classification can occur using one of most appropriate classification processes. That is, the system can be configured to select automatically one of available classification processes that would provide an optimal flow classification. In one embodiment, if the type of traffic is unknown (e.g., whether it is TCP traffic or UDP traffic), then the system can be configured to perform first a TCP bandwidth control operation as discussed above, and then to perform a UDP bandwidth control operation if the TCP bandwidth control operation produces no result. This is based on the assumption that more TCP traffic than UDP traffic is used. However, if more UDP traffic is used in the system, then the UDP bandwidth control operation may be performed first before the TCP bandwidth control operation is performed.

In still another embodiment, the bandwidth information provided by the bandwidth monitoring engine 22 for monitoring the bandwidth usage of flows can be used as another means of a flow classification. For instance, assume that there are two flows F1 and F2. F1 originates from station A and constitutes VoIP traffic. F2 originates from station B but constitutes non-real time traffic. The ToS/DiffServ bits are not set, so that it is only possible to use the MAC or IP address-based flow classification technique. In this case, the GW 20 can only determine that the flows F1 and F2 originate from different stations. But, since the GW 20 monitors the bandwidth usage, it will determine that the bandwidth usage for the flow F1 is approximately 64 Kbps (assuming the use of G.711 codec and reasonable network performance), which indicates that it is a VoIP traffic.

In yet another embodiment, although the maximum bandwidth a client can achieve is fixed, e.g., 11 Mbps, the actual bandwidth the client receives can depend heavily on the strength of the radio signal with the base-station it is connected to. The transmission speed of the client is varied in discrete steps (e.g., 1 Mbps, 2 Mbps, 5.5 Mbps, and 11 Mbps) depending on various thresholds for signal-strength. As such, the gateway controller 30 can be configured to obtain signal strength information from SNMP (Simple Network Management Protocol) queries to the base-station as known, and to use this information in determining bandwidth management policies used, at least in part, to control the bandwidth usage of each flow. In still another embodiment, instead of slowing down the packet transmission rate, it is possible to speed up the packet transmission rate using the present invention to control the bandwidth use, if that is desired.

Accordingly, the present invention provides an effective technique for controlling the bandwidth of data traffic for VPNs using flow classification techniques and packet-dropping or packet-denying techniques, so as to provide QoS for the VPNs. The present invention can be implemented using any known hardware and/or software. Any known computer programming language can be used to implement the present invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed:

1. A method for controlling bandwidth of data traffic for a virtual private network, the method comprising:
   classifying the data traffic for the virtual private network into different flows;
   monitoring a current bandwidth usage by at least one of the flows;
   comparing the current bandwidth usage with a predetermined threshold for the at least one of the flows; and
   performing a bandwidth control operation for the at least one of the flows based on the results from the comparing step,
   wherein the bandwidth control operation is performed for the at least one of the flows if the current bandwidth usage exceeds the predetermined threshold for that flow, and wherein the bandwidth control operation includes:
   alternating accept and deny times for internet protocol (IP) packets to accept or deny certain encapsulating packets of the data traffic.

2. The method according to claim 1, wherein the bandwidth control operation is for transport control protocol (TCP) or for user datagram protocol (UDP).

3. The method according to claim 1, wherein the bandwidth control operation includes:
   triggering a built-in congestion control mechanism to control the bandwidth of the data traffic.

4. The method according to claim 3, wherein, in the triggering step, the built-in congestion control mechanism is triggered by selectively dropping certain encapsulating packets of the data traffic.

5. The method according to claim 1, wherein the accept and deny times are selected such that the following relationship is established:

$$(t_{accept})/(t_{accept}+t_{deny})=b_{desd}/b_{curr}$$

wherein $t_{accept}$ represents the accept time, $t_{deny}$ represents the deny time, $b_{curr}$ represents a currently used bandwidth for the flow, and $b_{desd}$ represents the predetermined threshold.

6. The method according to claim 1, where the classifying step includes:
   examining at least one of an internet protocol (IP) address, a media access control (MAC) address, a type of service (ToS) field, and a differentiated service (DiffServ) field of each packet of the data traffic; and
   dividing the data traffic into flows based on the results from the examining step.

7. The method according to claim 6, wherein, in the classifying step, all packets with at least one of the same IP address, the same MAC address, the same ToS field, and the same DiffServ field are classified as a single flow.

8. The method according to claim 1, wherein the monitoring step includes:
   computing the current bandwidth usage by the at least one of the flow based on at least one of the following: a packet size for each packet in the flow, a flow type, a total number of packets present in the flow, and a predetermined time window set for the flow.

9. The method according to claim 1, wherein, in the comparing step, the predetermined threshold is determined based on predetermined quality of service (QoS) requirements.

10. The method according to claim 1, further comprising examining encapsulating packets associated with the virtual private network.

11. A system for controlling bandwidth of data traffic for a virtual private network, the system comprising:
    a gateway for classifying the data traffic for the virtual private network into different flows, monitoring a current bandwidth usage by at least one of the flows, comparing the current bandwidth usage with a predetermined threshold for the at least one of the flows, and performing a bandwidth control operation for the at least one of the flows based on the comparison results,
    wherein the gateway performs the bandwidth control operation for the at least one of the flows if the current bandwidth usage exceeds the predetermined threshold for that flow, and
    wherein the bandwidth control operation includes alternating accept and deny times for internet protocol (IP) packets to accept or deny certain encapsulating packets of the data traffic.

12. The system according to claim 11, further comprising:
    a gateway controller providing the predetermined threshold and bandwidth control information to the gateway, so as to control the bandwidth control operation of the gateway.

13. The system according to claim 12, wherein the gateway controller determines the predetermined threshold based on quality of service (QoS) requirements.

14. The system according to claim 11, wherein the bandwidth control operation is for transport control protocol (TCP) or for user datagram protocol (UDP).

15. The system according to claim 11, wherein the bandwidth control operation includes triggering a built-in congestion control mechanism of the gateway to control the bandwidth of the data traffic.

16. The system according to claim 15, wherein the built-in congestion control mechanism is triggered when the gateway selectively drops certain encapsulating packets of the data traffic.

17. The system according to claim 11, wherein the accept and deny times are selected such that the following relationship is established:

$$(t_{accept})/(t_{accept}+t_{deny})=b_{desd}/b_{curr}$$

wherein $t_{accept}$ represents the accept time, $t_{deny}$ represents the deny time, $b_{curr}$ represents a currently used bandwidth for the flow, and $b_{desd}$ represents the predetermined threshold.

18. The system according to claim 11, where the gateway examines at least one of an internet protocol (IP) address, a media access control (MAC) address, a type of service (ToS) field, and a differentiated service (DiffServ) field of each packet of the data traffic, and thereby classifies the data traffic into flows based on the examination results.

19. The system according to claim 18, wherein the gateway classifies all packets with at least one of the same IP address, the same MAC address, the same ToS field, and the same DiffServ field, as a single flow.

20. The system according to claim 11, wherein the gateway computes the current bandwidth usage by the at least one of the flow based on at least one of the following: a packet size for each packet in the flow, a flow type, a total number of packets present in the flow, and a predetermined time window set for the flow.

21. The system according to claim 11, wherein the gateway classifies encapsulating packets associated with the virtual private network.

22. A computer program embodied on a computer-readable medium, for controlling bandwidth of data traffic for a virtual private network, the computer program comprising computer-executable instructions for:

classifying the data traffic for the virtual private network into different flows;

monitoring a current bandwidth usage by at least one of the flows;

comparing the current bandwidth usage with a predetermined threshold for the at least one of the flows; and performing a bandwidth control operation for the at least one of the flows based on the results from the comparing step, wherein the bandwidth control operation is performed for the at least one of the flows if the current bandwidth usage exceeds the predetermined threshold for that flow, and wherein the computer-executable instructions for performing the bandwidth control operation include computer-executable instructions for:

alternating accept and deny times for internet protocol (IP) packets to accept or deny certain encapsulating packets of the data traffic.

23. The computer program according to claim 22, wherein the bandwidth control operation is for transport control protocol (TCP) or for user datagram protocol (UDP).

24. The computer program according to claim 22, wherein the computer-executable instructions for performing the bandwidth control operation include computer-executable instructions for:

triggering a built-in congestion control mechanism to control the bandwidth of the data traffic.

25. The computer program according to claim 24, wherein the built-in congestion control mechanism is triggered by selectively dropping certain encapsulating packets of the data traffic.

26. The computer program according to claim 22, wherein the accept and deny times are selected such that the following relationship is established:

$$(t_{accept})/(t_{accept}+t_{deny})=b_{desd}/b_{curr}$$

wherein $t_{accept}$ represents the accept time, $t_{deny}$ represents the deny time, $b_{curr}$ represents a currently used bandwidth for the flow, and $b_{desd}$ represents the predetermined threshold.

27. The computer program according to claim 22, where the computer-executable instructions for classifying include computer-executable instructions for:

examining at least one of an internet protocol (IP) address, a media access control (MAC) address, a type of service (ToS) field, and a differentiated service (DiffServ) field of each packet of the data traffic; and dividing the data traffic into flows based on the examination results.

28. The computer program according to claim 27, wherein all packets with at least one of the same IP address, the same MAC address, the same ToS field, and the same DiffServ field are classified as a single flow.

29. The computer program according to claim 22, wherein the computer-executable instructions for monitoring include computer-executable instructions for:

computing the current bandwidth usage by the at least one of the flow based on at least one of the following: a packet size for each packet in the flow, a flow type, a total number of packets present in the flow, and a predetermined time window set for the flow.

30. The computer program according to claim 22, wherein the predetermined threshold is determined based on predetermined quality of service (QoS) requirements.

31. The computer program according to claim 22, wherein the computer-executable instructions for performing the classifying include computer-executable instructions for examining encapsulating packets associated with the virtual private network.

32. A method for controlling bandwidth of data traffic for a virtual private network, the method comprising:

classifying the data traffic for the virtual private network into different flows;

monitoring a current bandwidth usage by at least one of the flows;

comparing the current bandwidth usage with a predetermined threshold for the at least one of the flows; and performing a bandwidth control operation for the at least one of the flows based on the results from the comparing step;

wherein the at least one flow comprises encapsulated data packets and wherein the bandwidth control operation comprises dropping certain ones of the encapsulated data packets without regard to whether the encapsulated data packets are TCP data packets or UDP data packets.

33. The method according to claim 32, wherein the bandwidth control operation includes triggering a built-in congestion control mechanism to control the bandwidth of the data traffic.

34. A system for controlling bandwidth of data traffic for a virtual private network, the system comprising:

a gateway for classifying the data traffic for the virtual private network into different flows, monitoring a current bandwidth usage by at least one of the flows, comparing the current bandwidth usage with a predetermined threshold for the at least one of the flows, and performing a bandwidth control operation for the at least one of the flows based on the comparison results, wherein the at least one of the flows comprises encapsulated data packets and wherein the gateway performs the bandwidth control operation by dropping certain ones of the encapsulated data packets without regard to whether the encapsulated data packets are TCP data packets or UDP data packets.

35. The system according to claim 34 wherein the bandwidth control operation includes triggering a built-in congestion control mechanism of the gateway to control the bandwidth of the data traffic.

36. A computer program embodied on a computer-readable medium, for controlling bandwidth of data traffic for a virtual private network, the computer program comprising computer-executable instructions for:

classifying the data traffic for the virtual private network into different flows, at least one of the flows comprising encapsulated data packets;

monitoring a current bandwidth usage by the at least one of the flows;

comparing the current bandwidth usage with a predetermined threshold for the at least one of the flows; and performing a bandwidth control operation for the at least one of the flows based on the results from the comparing step by dropping certain ones of the encapsulated data packets without regard to whether the encapsulated data packets are TCP data packets or UDP data packets.

37. The computer program according to claim 36 wherein the computer-executable instructions for performing the bandwidth control operation include computer-executable instructions for triggering a built-in congestion control mechanism to control the bandwidth of the data traffic.

* * * * *